(12) United States Patent
Lucas

(10) Patent No.: US 10,636,253 B2
(45) Date of Patent: Apr. 28, 2020

(54) DEVICE TO EXECUTE A MOBILE APPLICATION TO ALLOW MUSICIANS TO PERFORM AND COMPETE AGAINST EACH OTHER REMOTELY

(71) Applicant: Max Lucas, Hanover, MD (US)

(72) Inventor: Max Lucas, Hanover, MD (US)

( * ) Notice: Subject to any disclaimer, the term of this patent is extended or adjusted under 35 U.S.C. 154(b) by 0 days.

(21) Appl. No.: 16/009,231

(22) Filed: Jun. 15, 2018

(65) Prior Publication Data
US 2019/0385411 A1    Dec. 19, 2019

(51) Int. Cl.
*A63F 9/00* (2006.01)
*G07F 17/32* (2006.01)
*G06F 9/54* (2006.01)
*G06T 13/40* (2011.01)
*G06T 19/00* (2011.01)
*G06F 16/48* (2019.01)

(52) U.S. Cl.
CPC .......... *G07F 17/3272* (2013.01); *G06F 9/542* (2013.01); *G06F 16/48* (2019.01); *G06T 13/40* (2013.01); *G06T 19/003* (2013.01)

(58) Field of Classification Search
None
See application file for complete search history.

(56) References Cited

U.S. PATENT DOCUMENTS

| | | | | |
|---|---|---|---|---|
| 8,162,758 B1 * | 4/2012 | Powers | .............. | H04N 21/2743 463/42 |
| 8,649,889 B2 * | 2/2014 | Cacciolo, Jr. | ....... | G07F 17/3272 463/42 |
| 8,678,932 B2 * | 3/2014 | Alman | ..................... | A63F 13/61 463/40 |
| 9,707,474 B1 * | 7/2017 | Cardinale | ............. | A63F 13/213 |
| 10,124,261 B1 * | 11/2018 | Cardinale | ............... | A63F 13/35 |
| 10,311,679 B2 * | 6/2019 | Washington | ........ | G07F 17/3244 |
| 2003/0171982 A1 * | 9/2003 | Paul | ....................... | G07C 13/00 705/12 |

(Continued)

OTHER PUBLICATIONS

"Taunting". Oct. 24, 2017. <https://web.archive.org/web/20171024010423/https://en.wikipedia.org/wiki/Taunting>. Accessed Jul. 24, 2019 (Year: 2017).*

*Primary Examiner* — Seng H Lim
(74) *Attorney, Agent, or Firm* — The Iwashko Law Firm, PLLC; Lev Ivan Gabriel Iwashko

(57) ABSTRACT

A mobile device to execute a mobile application to allow a user to perform and compete against another user remotely, the mobile device including a processor including a storage unit to store at least one of user faces, videos, song details, song lyrics, venue locations, and avatar characteristics, and to allow the user to access the at least one of the user faces, videos, song details, song lyrics, venue locations, and avatar characteristics via the mobile application, an input unit to allow the user to select the at least one of the user faces, videos, song details, song lyrics, venue locations, and avatar characteristics, a display unit to display the at least one of the selected user faces, videos, song details, song lyrics, venue locations, and avatar characteristics, a video camera to record a video file of the user as the user performs a song, and a microphone to capture an audio file of the user-performed song, such that the video file and the audio file may be selected by the user to compete against the another user.

6 Claims, 1 Drawing Sheet

(56) References Cited

U.S. PATENT DOCUMENTS

| | | | |
|---|---|---|---|
| 2005/0206610 A1* | 9/2005 | Cordelli | A63F 13/10 |
| | | | 345/156 |
| 2007/0225070 A1* | 9/2007 | Zahorik | A63F 13/12 |
| | | | 463/29 |
| 2009/0038468 A1* | 2/2009 | Brennan | G09B 5/06 |
| | | | 84/609 |
| 2011/0021273 A1* | 1/2011 | Buckley | A63F 13/00 |
| | | | 463/31 |
| 2012/0015724 A1* | 1/2012 | Ocko | A63F 13/61 |
| | | | 463/31 |
| 2012/0235357 A1* | 9/2012 | Chambers | A63F 3/00643 |
| | | | 273/429 |
| 2013/0184082 A1* | 7/2013 | Patchen | A63F 13/798 |
| | | | 463/42 |
| 2013/0271456 A1* | 10/2013 | Haswell | G06T 19/003 |
| | | | 345/420 |
| 2015/0066699 A1* | 3/2015 | Fisher | G06Q 30/0623 |
| | | | 705/26.61 |
| 2015/0227905 A1* | 8/2015 | Rivera | G10H 1/365 |
| | | | 705/40 |
| 2016/0027260 A1* | 1/2016 | Pierce | G07F 17/3237 |
| | | | 463/7 |
| 2016/0078853 A1* | 3/2016 | Gonczi | A63F 13/42 |
| | | | 700/92 |
| 2017/0017987 A1* | 1/2017 | Thomas | G06Q 30/0243 |
| 2018/0349703 A1* | 12/2018 | Rathod | H04W 4/029 |
| 2018/0350144 A1* | 12/2018 | Rathod | H04W 4/029 |
| 2019/0035372 A1* | 1/2019 | Yoelin | G10H 1/365 |
| 2019/0156410 A1* | 5/2019 | Yankovich | G06F 16/58 |
| 2019/0200060 A1* | 6/2019 | Rivera | H04N 21/4312 |
| 2019/0324614 A1* | 10/2019 | Brillon | G07F 17/305 |

\* cited by examiner

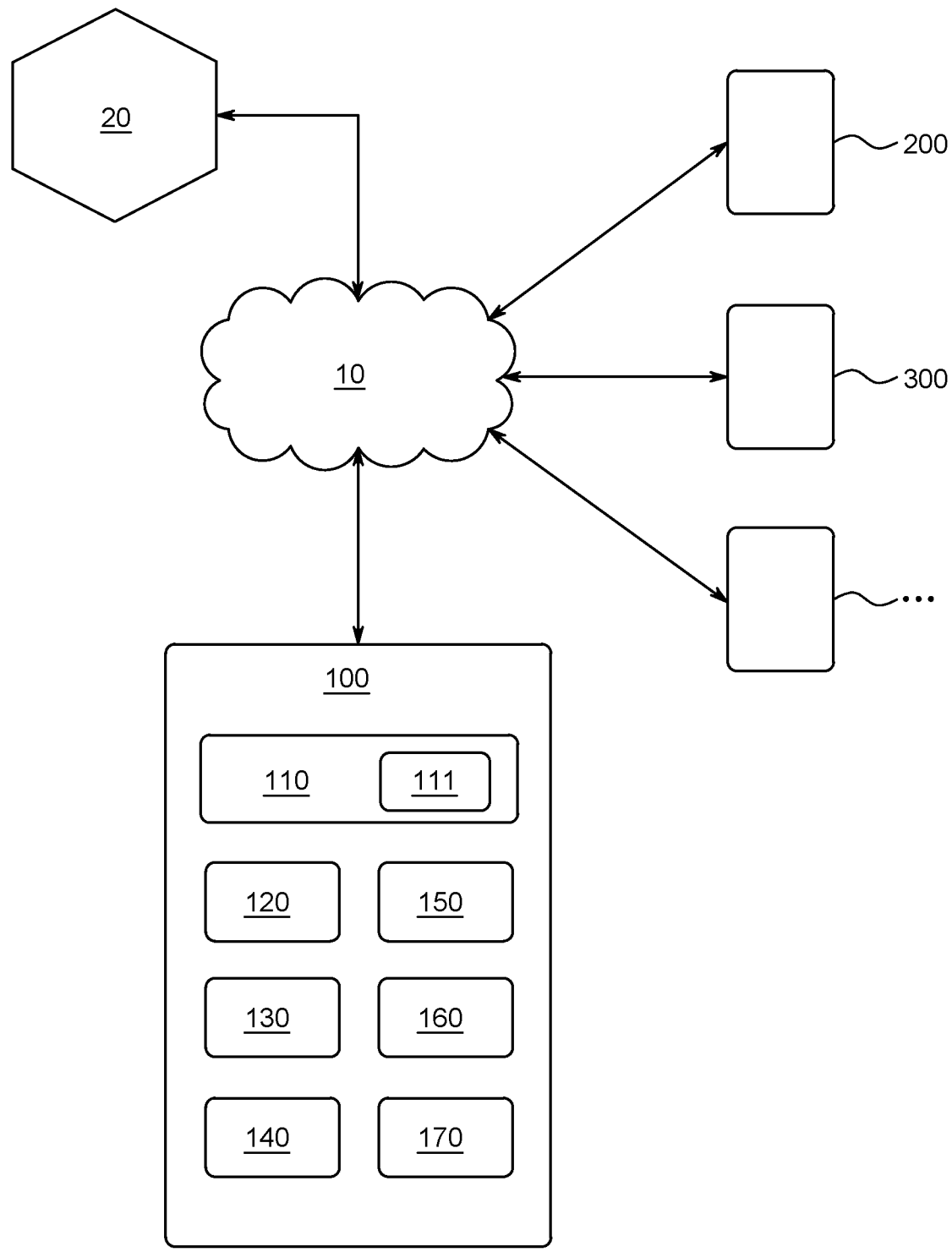

DEVICE TO EXECUTE A MOBILE APPLICATION TO ALLOW MUSICIANS TO PERFORM AND COMPETE AGAINST EACH OTHER REMOTELY

BACKGROUND

1. Field

The present general inventive concept relates generally to a device to execute a mobile application, and particularly, a device to execute a mobile application to allow musicians to perform and compete against each other remotely.

2. Description of the Related Art

Breaking into the music industry can be challenging because it requires artists to invest time in getting people interested in their musical talents. Marketing, advertising, and networking are key strategies to help artists acquire fans, connections, and an audience, while also taking the time to continually work on self-improving their music, stage presence, and style.

Also, there are amateur musical enthusiasts that simply enjoy performing their songs in the privacy of their own homes, but would also enjoy sharing their performances with others.

Furthermore, there are musicians that enjoy competing with one another.

Therefore, there is a need for a mobile application that allows musicians to showcase their talents, while also allowing them to compete against each other.

SUMMARY

The present general inventive concept provides a device to execute a mobile application to allow musicians to perform and compete against each other remotely.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a mobile device to execute a mobile application to allow a user to perform and compete against another user remotely, the mobile device including a processor including a storage unit to store at least one of user faces, videos, song details, song lyrics, venue locations, and avatar characteristics, and to allow the user to access the at least one of the user faces, videos, song details, song lyrics, venue locations, and avatar characteristics via the mobile application, an input unit to allow the user to select the at least one of the user faces, videos, song details, song lyrics, venue locations, and avatar characteristics, a display unit to display the at least one of the selected user faces, videos, song details, song lyrics, venue locations, and avatar characteristics, a video camera to record a video file of the user as the user performs a song, and a microphone to capture an audio file of the user-performed song, such that the video file and the audio file may be selected by the user to compete against the another user.

The input unit may allow the user to select a particular one of the another user to compete against.

The mobile device may further include a communication unit to allow the user to communicate with at least one other mobile device possessed by the another user via the Internet.

The mobile device may further include a speaker to allow the user to hear songs performed by at least one of the user and the another user.

The processor may execute the mobile application that allows the user to roam digital streets displayed on the display unit, and to enter venues to allow the user to compete in rapping competitions against the another user.

The mobile device may communicate with a server to allow the user to deposit monetary funds thereinto and extract the monetary funds therefrom in response to winning and losing a battle against the another user.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 1 illustrates block diagram of a mobile device communicating with a plurality of other mobile devices and a server via the Internet, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

FIG. 1 illustrates a mobile device 100 to execute a mobile application 1 to allow musicians to perform and compete against each other remotely, according to an exemplary embodiment of the present general inventive concept.

More specifically, FIG. 1 illustrates block diagram of the mobile device 100 communicating with a plurality of other mobile devices 200, 300, etc., and a server 20 via the Internet 10, according to an exemplary embodiment of the present general inventive concept.

The mobile device 100 may include a cellular telephone, a laptop computer, a tablet computer, a desktop computer, or any other mobile device having Internet connectivity capabilities.

The mobile device 100 may include a processor 110, a display unit 120, an input unit 130, a video camera 140, a microphone 150, a speaker 160, and a communication unit 170.

The processor 110 may include storage units, such as RAM, ROM, flash memory, etc., circuitry to be able to read and interpret a mobile application and/or program, and a controller to control when the communication unit 170 interacts with the Internet 10 and or the display unit 120 based on instructions input in the input unit 130.

The Internet 10 may include any type of network, including, but not limited to, at least one of the Internet, a cellular network, a universal mobile telecommunications systems (UMTS) network, a Long Term Evolution (LTE) network, a Global System for Mobile Communications (GSM) network, a local area network (LAN), a virtual private network (VPN) coupled to the LAN, a private cellular network, a private telephone network, a private computer network, a private packet switching network, a private line switching network, a private wide area network (WAN), a corporate network, or any number of private networks that can be referred to as an Intranet.

When the mobile application 1 is running on the mobile device 100, the display unit 120 may display user faces, videos, song details, song lyrics, avatar characteristics, or any other media recorded on or playable by the mobile device 100, which may also be stored in the storage unit 111 or directly within the mobile application 1, or alternatively, within a server 20.

The server 20 may also allow the mobile device 100 to communicate with other mobile devices 200, 300, etc. Alternatively, the mobile device 100 may communicate with the other mobile devices 200, 300, etc., directly via the Internet 10 through the mobile application 1.

The input unit 130 may include a keyboard, a mouse, a touchpad, a touchscreen, the microphone 150, or any other input unit known to one of ordinary skill in the art. The microphone 150 may act as a voice-command input unit to control the mobile application 1.

While the user is singing the song, the speaker 160 may play a melody of the song without the original singer's voice being heard (i.e., the karaoke version of the song), and the microphone 150 may pick up a voice of the user, such that the voice of the user may be recorded along with the music.

Also, the video camera 140 may visually record the user while the song is being sung.

Alternatively, the mobile application 1 may play a beat, and a user may freestyle rap battle against another user who is also using the mobile application 1 from a different mobile device at a different location. In other words, the communication unit 170 allows multiple mobile devices to communicate with each other via the mobile application 1.

The processor 110 and/or the mobile application 1 may convert the audio or the video recorded during the user's singing of the song into various type of media files (.mpeg, .mp3, .mp4, .avi, .mov, etc.) that may be saved onto a storage unit 111 of the mobile device 100. Also, the media files may be shared on social media, such as INSTAGRAM, YOUTUBE, FACEBOOK, etc. As such, various users can watch videos of each other's performances, and choose to battle each other.

The mobile application 1 may be executed by a user finding the mobile application 1 on the display unit 120, and then using the input unit 130 to select the mobile application 1 to be execute. The mobile application 1 may be designed to market new artists and make them successful in their music. When the mobile application 1 is executed, a user may use the input unit 130 to select an avatar displayed on the display unit 120 that best fits the user. The user may be able to choose from different clothes, different accessories, different hair colors, and different skin colors displayed on the display unit 120.

All selection may be performed using the input unit 120, and all displayed images may be displayed on the display unit 130.

Once the user has selected what the avatar looks like, then the user may choose a zip code to represent. The user may be representing a largest city closest to the selected zip code. A mission may be to then find a recording studio and then create a 10-second verbal signature, which denotes who the user is and where the user is from. For example, the user may talk into the microphone 150 and state "yo yo it's Max from Baltimore, you don't want none of this."

After the user's signature is recorded, then the user may be ready to play a rap battle game against other users. There may be multiple locations the user will be able to enter off of a street displayed on a map on the display unit 120. There may be a studio, a lounge, a club, a show, and an airport, where some of these venues cost money to enter, and some are free. For example, the following may be selectable venues and prices: STUDIO—$4.99 PER HOUR LOUNGE—FREE CLUB—$0.99 cents ENTRY FEE SHOW—$2.99 ENTRY FEE AIRPORT—$0.35 PER FLIGHT ALL OF THESE PLACES WILL BE LOCATED ON A MAP BY COLORED DOTS. The user may see a door of the venue in the mobile application lit up as a same color as a dot on the map. In other words, if the bot is red, the door may be red.

The studio (STUDIO: RED DOT/RED DOOR) may be designed for people to record music and be able to save it in the storage unit 111, so the user can use it at any time during the game. Also beat makers can download instrumental beats to the studio that users can choose from and buy to record their music on to make songs.

The lounge (LOUNGE: YELLOW DOT/YELLOW DOOR) may have free entry so people may use these to learn how the mobile application 1 functions, to also battle rap, and to view other Rappers! This will also help to build clout and buzz for the users.

The club (CLUB: $0.99 CENTS ENTRY FEE—(BLUE DOT/BLUE DOOR)), may allow users to only battle rap and spectate and receive rewards such as clout and buzz points.

The show (SHOW: $2.99 ENTRY FEE—(GREEN DOT/GREEN DOOR)), may allow users to maximize their talent and battle rap live or perform their music by themselves to build their clout status and get major buzz points also win accessories!

Also, users may be given three options at the show, to either spectate, judge, or rap. Spectators can see the live show and decide to give props and taunt. Judges can judge a performance along three different categories, from a 1-10 scale such as LYRICS—DELIVERY—AND STYLE OF CLOTHS AND ACCESORIES!! HIGHER SCORES RECIEVE BETTER PRIZE PACAGES!!

The airport (AIRPORT—$0.35 cents PER FLIGHT—(WHITE DOT/WHITE DOOR)) allows users to "fly" anywhere they want for only 35 cents, for example, to see what's happening live in other cities, and to build clout and buzz points as well.

The basic principle of the mobile application 1 is to allow users to perform their music while getting as many listeners to hear them as possible around the world. The ultimate goal is to become famous in real life from the mobile application 1. The mobile application 1 may allow the users to market their content for a better price than what is offered around the world right now.

AVATAR FUNCTIONS: The Avatar should be able to roam freely, preferably in 3d. The avatar may have an option to smoke cigarettes. The avatar can taunt, give props, or boo and throw a tomato! Users may be provided one tomato per show. Only at a show will a user be able to get a tomato and they can only throw it at the end of the performance and it will hit the stage, not the user!

TAUNTING A PLAYER: There may be three types of taunts.

STREET TAUNT: Taunting players on the street by raising both hands in the air.

CLUB TAUNT: Taunting players by standing in the crowd and raising middle finger while spectating.

SHOW TAUNT: Throwing a tomato at end of performance.

GIVING A PLAYER PROPS: Their may be 3 types of props.

STREET PROPS: Giving props on the street allows a player to nod their head up and down.

CLUB PROPS: Giving props in the club allows a player to move side to side during a performance.

SHOW PROPS: Allows a player to raise one hand up and down during a performance.

At the end of show, a lighter icon and a tomato icon may pop to allow the user to either throw a tomato or hold a lighter in the air.

MARKETING: Certain clothes jewelry and accessories will give the user more points and rewards then others.

CLOUT: Clout is people listening to a user so the user may acquire listeners and followers on INSTAGRAM or TWITTER. The more listeners the user acquires, the more popular the music may be. The user may acquire clout by making purchases or doing shows and going to lounges and clubs.

BUZZ POINTS: Getting buzz points allows the user to gain popularity and certain access to different events. The bigger buzz, the more VIP treatment the user may receive throughout the mobile application 1. The user may acquire buzz points by marketing music on the street, showing wins and song plays, an also making purchases, such that bigger purchases acquire bigger buzz points. Every time the user makes a purchase, the user acquires more clout and more buzz.

Every time a person listens to one of the user's songs, it may count as 1 buzz point.

TOP 300 HOT LIST: There may be something called a "HOT LIST," which is where the users may be ranked according to buzz points!! The user with the most buzz points will be at the number 1 spot. Buzz points cannot be purchased, but users will be awarded buzz points with every purchase and at every event the user performs. The top ten spots of the list will be broadcasted on everyone's profile page around the world. But the other 290 hot list players will be featured on their own city's hot list, so Baltimore, for example, will have a top 290 users with the most buzz. Every city may have its own hot list.

JEWELRY: Silver, gold, and platinum categories may define how many rewards users get per purchase.

SILVER CHAIN: $4.99—Comes with 1,000 clout listeners and 1,000 buzz points.

GOLD CHAIN: $9.99—Comes with 5.000 clout listeners and 10,000 buzz points.

PLATINUM CHAIN: $24.99—Comes with 20,000 clout listeners and 50,000 Buzz points.

People will have an option of all different jewelry as far as bracelets, watches, chains, earrings, different pendants, and all come with the silver, gold, and platinum rewards options BOOMBOX: $4.99—Users can buy a Boom box and play their music on the street for people to hear on the "street" within the mobile application 1, and it will also come with 1,000 buzz points and 100 clout listeners.

WALKMAN: $9.99—Walkman allows users to have their music played live, like a radio, so it will be used like a boom box but for listeners around the globe and not just the user's city. By purchasing a Walkman, it allows the user to listen to other users' music while randomly playing different songs people have recorded around the globe. This will acquire buzz points and listeners when the user is not playing the game!! Each play of a song allows the user to acquire is 1 buzz point CIGARETTES: $2.99—Smoking allows you to get buzz points. Buying cigarettes automatically gives the user rewards regardless whether the user chooses to smoke them REWARD FOR SMOKING: 50 clout listeners and 250 buzz points every purchase!

CELL PHONE: $0.99 cents—A Cell phone is a very crucial part of the mobile application 1, because it allows the user to stay in contact with the users so the user can send and receive verbal text messages on the cell phone in the mobile application 1, allowing the user to perform shows as a group or go spectate a show together. When the user performs at a show, the user can make a guest list and people from the contacts in the phone on the game can get an alert whenever the user is performing and choose to fly there or come there instantly after hearing the message. This way the user can send his/her crew or group of Rap partners a verbal message and be at the same spot at the same time, kind of like . . . "hey Jim, it's Max, and I want you to hear this guy I'm rapping against . . . he sounds really good!").

STREET BATTLE RAPPING: Users can wander in any city they want, choosing to battle whomever they please.

Although the mobile application 1 is designed to allow rappers to battle each other, other types of artists may also battle each other, such as instrumentalists, singers, poets, etc. In other words, the mobile application 1 may be a program executed by the processor 110, which may be a game that allows users (i.e., musicians, rappers, singers, etc.) to remotely compete against each other in singing and/or rapping battles.

Also, the server 20 may store information regarding bank accounts and/or monetary accounts and systems to allow all users of the mobile devices 100, 200, 300, etc., to transmit funds thereto, and/or extract monetary funds therefrom.

As such, the mobile device 100 may communicate with the server 20 to allow the user to deposit monetary funds thereinto and extract the monetary funds therefrom in response to winning and losing a battle against the another user using one of the other mobile devices 200, 300, etc.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A mobile device to execute a mobile application to allow a user to perform and compete against another user remotely, the mobile device comprising:
   a processor including a storage unit to store at least one of user faces, videos, song details, song lyrics, venue locations, and avatar characteristics, and to allow the user to access the at least one of the user faces, videos, song details, song lyrics, venue locations, and avatar characteristics via the mobile application;
   an input unit to allow the user to select the at least one of the user faces, videos, song details, song lyrics, venue locations, and avatar characteristics,
   wherein the input unit via the mobile application further allows the user to control a taunt of an avatar of the user, such that the taunt is at least one of a street taunt, a club taunt, and a show taunt, choose a zip code or location to represent before performing, find a virtual recording studio and create a verbal signature in response to receiving a mission and allows the another user to listen to the user on a digital street while roaming through the digital street;
   a display unit to display the at least one of the selected user faces, videos, song details, song lyrics, venue locations, and avatar characteristics, such that the display unit via the mobile application displays the avatar moving through each venue location in a 3D environment;
   a video camera to record a video file of the user as the user performs a song; and
   a microphone to capture an audio file of the user-performed song, such that the video file and the audio file may be selected by the user to compete against the another user.

2. The mobile device of claim 1, wherein the input unit allows the user to select a particular one of the another user to compete against.

3. The mobile device of claim 1, further comprising:
   a communication unit to allow the user to communicate with at least one other mobile device possessed by the another user via the Internet.

4. The mobile device of claim 1, further comprising:
   a speaker to allow the user to hear songs performed by at least one of the user and the another user.

5. The mobile device of claim 1, wherein the processor executes the mobile application that allows the user to roam digital streets displayed on the display unit, and to enter venues to allow the user to compete in rapping competitions against the another user.

6. The mobile device of claim 1, wherein the mobile device communicates with a server to allow the user to deposit monetary funds thereinto and extract the monetary funds therefrom in response to winning and losing a battle against the another user.

* * * * *